July 3, 1951 P. L. PORTER ET AL 2,559,047
LOCKING DEVICE
Filed Jan. 8, 1946 2 Sheets-Sheet 1

INVENTORS
ARTHUR D. ARMSTRONG AND
PERCY L. PORTER
BY
George J. Smyth
ATTORNEY

July 3, 1951  P. L. PORTER ET AL  2,559,047
LOCKING DEVICE
Filed Jan. 8, 1946  2 Sheets-Sheet 2
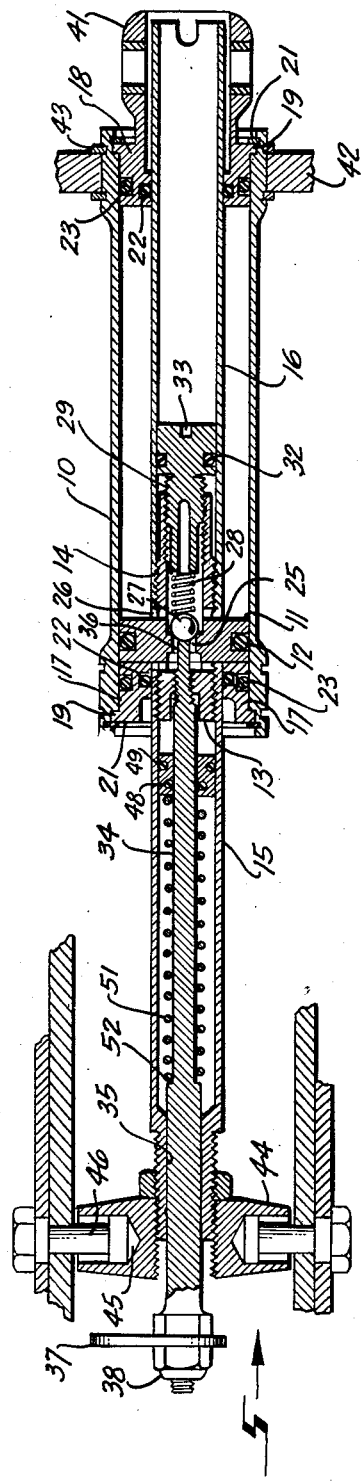
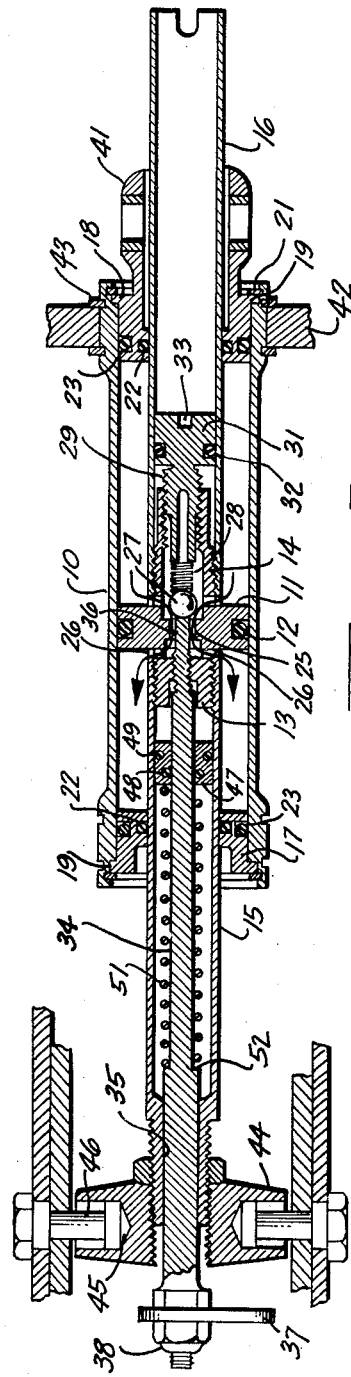
INVENTORS
ARTHUR D. ARMSTRONG AND
PERCY L. PORTER
BY
George F. Smyth
ATTORNEY Patented July 3, 1951

2,559,047

UNITED STATES PATENT OFFICE 2,559,047

LOCKING DEVICE

Percy L. Porter and Arthur D. Armstrong,
Los Angeles, Calif.

Application January 8, 1946, Serial No. 639,856

9 Claims. (Cl. 188—96)

This invention relates to locking devices, and more particularly to a hydraulic locking device adapted to hold two relatively movable elements in any desired position of adjustment.

The locking device of the present invention in the broadest aspects thereof comprises means including a displaceable, non-compressible fluid normally held captive for holding relatively movable elements in some desired relative position but allowing relative movement of the same upon release of the fluid.

In the illustrated embodiment of the present invention the fluid is held captive in a sealed cylinder carrying a piston provided with oppositely extending tubular members passing through suitable seals carried by the opposite end walls of the cylinder. As long as the non-compressible fluid is prevented from being displaced from one side of the piston to the other no movement of the piston can occur. Thus, if the cylinder is connected to one of the relatively movable elements and the piston to the other, the two elements will be held or locked against relative movement as long as the fluid is held captive.

To permit movement of the relatively movable elements, means are provided for permitting the fluid to bypass the piston and flow from either side of the piston to the other, depending upon the movement of the force applied to the piston. In the embodiment of the invention illustrated, the bypass means comprises a normally closed passageway coaxially formed in the piston. The passageway, although normally closed, can be opened for the passage of fluid from one side of the piston to the other as the piston moves relative to the cylinder. The passageway is normally closed by a spring-pressed valve which may be opened against the action of the spring by an actuator controlled by an operator mounted exteriorally of the cylinder.

Although the actuator may take different forms, in the form of the invention herein disclosed, the actuator is an elongate rod coaxially mounted within one of the tubular members carried by the piston and movable longitudinally thereof. As the spring-pressed valve can take the form of a ball held by the spring on a seat formed within the passageway of the piston, movement of the actuator in one direction will urge the ball off its seat to open the valve, while movement of the actuator in the opposite direction will allow the spring to urge the ball back against its seat to close the passageway.

As the actuator is carried within the tubular member, and as the bypass requires no external connections, the device may be maintained at a minimum size. This permits the weight of the device to be kept relatively low, which is important in the aircraft industry where weight is an important factor.

Another feature of the present invention resides in the fact that the device of the invention will hold two relatively movable elements in any desired position of adjustment. The number of positions of adjustment are infinite and are not limited by any mechanical interlocking means commonly found in prior art locking devices.

Other features and advantages of the present invention will be apparent from the following description taken in connection with the accompanying drawing in which:

Figure 2 is a sectional view showing the passageway through the piston closed by the ball and the piston in one adjusted position relative to the cylinder;

Figure 3 is a view similar to Figure 2 but showing the passageway open and piston in another adjusted position relative to the cylinder;

Figure 4:
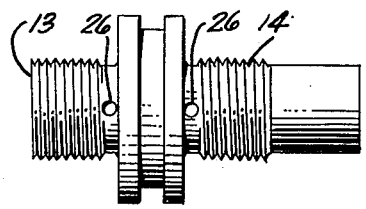
Figure 4 is an elevational view of the piston removed from the cylinder.
Figure 5:
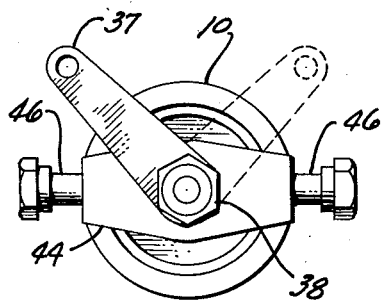
Figure 5 is an end view of the device of the present invention.
Figure 6:
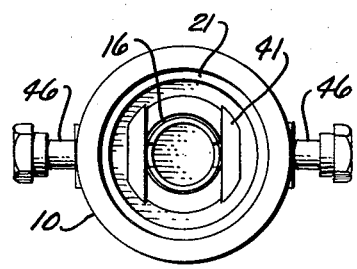
Figure 6 is a view similar to Figure 5 but showing the oppposite end of the device.

The device of the present invention, referring now to the drawing, and more particularly to Figures 2 and 3 thereof, comprises a cylinder 10 housing a piston 11 herein shown as a disc formed with a groove about the periphery thereof. The groove receives a packing gland 12 such as an O-ring to seal the annular passage between the piston 11 and the inner wall of the cylinder 10. The piston 11, as best seen in Figure 4, is formed with a pair of hollow bosses 13 and 14 projecting outwardly from the opposite faces thereof. The bosses are cylindrical in shape and are coaxially carried by the piston. Although the bosses 13 and 14 may be separately formed and attached in any manner desired to the opposite faces of the piston 11, in the now preferred embodiment of the invention they are formed integral with the piston.

The outer surfaces of the bosses 13 and 14 are formed with screw threads for taking the threaded ends of elongate tubular members 15 and 16, respectively. The tubular members move with the piston and can be likened to piston rods in more conventional cylinder and piston installations. The members 15 and 16 are equal in diameter and are of a length greater than the length of the piston 11.

The opposite ends of the cylinder 10 are closed by transverse wall members 17 and 18, respectively, each formed with an out-turned flange 19 held against an internal shoulder provided at each end of the cylinder 10 by a locking ring 21. The wall members 17 and 18 are each formed with a centrally located aperture for slidably passing the tubular members 15 and 16.

The wall of each aperture is formed with an annular groove for receiving sealing members such as the O-rings 22 for sealing the annular passage between the walls of the apertures and the outer surface of the tubular members. Each of the transverse wall members 17 and 18 carries in a peripheral groove a sealing member 23 for sealing the annular space between the outer surface of each wall member and the inner surface of the cylinder 10. The cylinder is thus sealed against the loss of any fluid held thereby.

The cylinder is intended to be completely filled with a non-compressible fluid preferably a liquid and it will be seen that with the cylinder completely filled with such a liquid no movement of the piston could occur relative to the cylinder if some means were not provided for permitting the liquid in the cylinder to flow from one side of the piston to the other. This means may comprise a bypass means mounted exteriorly of the cylinder and connected into the same. In the now preferred form of the invention, however, the bypass means comprises a passageway 25 centrally extending through the piston and communicating with the liquid held by the cylinder by transversely extending, diametrically-spaced passages 26 formed in the bosses 13 and 14 and aligned with apertures provided in the inner ends of the tubular members 15 and 16 when the latter are threaded onto the bosses.

In the now preferred form of the present invention, the one end of the passageway 25 is formed with a spherical seat for receiving a ball 27 normally held against the seat by a spring 28 seating on a plug member 29 threadedly mounted within the mouth of the tubular member 16. The plug 29 is formed with a sealing gland 31 here shown as integral with the plug 29. The sealing gland is provided with an annular groove receiving a sealing member such as the O-ring 32, which prevents any liquid which might work past the threaded connections between the plug 29 and the boss 14 as well as the connection between the latter and the tubular member 16 from passing into the outer end of the same.

As the plug 29 is threadedly mounted in the mouth of the tubular member 16, adjustment of the plug will vary the tension of the spring 28 and in turn vary the action of the spring against the ball 27. To facilitate this adjustment the end face of the gland 29 is formed with a suitably formed slot or kerf 33 in which a tool, inserted into the open, outer end of the tubular member, can be engaged.

To permit the valve formed by the ball 27 and its seat to be opened when it is desired to move the piston relative to the cylinder, the tubular member 15 carries an actuator 34 which is threadedly mounted at the inner end thereof within the boss 13 carried by the piston 11. The outer end of the actuator 34 is enlarged and is slidably supported by a bearing surface 35 formed internally of the tubular member. It will now be seen that rotation of the actuator 34, due to its threaded connection to the boss 13, will bring about longitudinal displacement of the actuator relative to the tubular member 15. Thus, rotation of the actuator 34 in one direction will move the actuator inwardly of the member 16 to bring the finger 36 carried at the inner end of the actuator into engagement with the ball 27 and continued rotation of the actuator in the same direction will urge the ball off its seat against the action of the spring 28. The passageway 25, as should now be understood, is opened by movement of the ball from its seat so that relative movement can occur between the piston 10 and the cylinder 11.

To bring about rotation of the actuator any means desired can be so connected to the outer end of the same as to cause rotation of the actuator in one direction upon one operation of the same, and to bring about rotation of the actuator in the opposite direction upon another operation of the same. In the illustrated embodiment of the present invention this means comprises a finger 37 held to the outer end of the actuator 34 by a suitable nut 38. It is to be understood that some means such as a flexible cable running, if necessary, over suitable pulleys can be fixed at one end to the finger 37 with the opposite end thereof attached to an actuator or the like located conveniently to the operator of the locking device.

Figure 1:
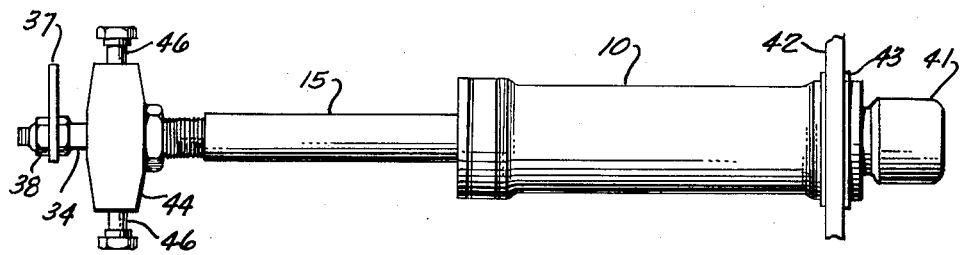
Figure 1 is an elevational view of the locking device of the present invention.

In the use of the device of the present invention the tubular member 15 is to be connected to one of the relatively movable elements, and the cylinder to the other of the elements. Any means desired may be used for connecting the piston and cylinder, respectively, to the relatively movable elements. The cylinder may be connected to its element through a bracket member 41 formed integral with the transverse wall member 18 mounted within the right-hand end of the cylinder, as viewed in Figure 1. The bracket member 41, as should be understood, will be formed to cooperate with the particular shape of the element with which it is to be used.

In some installations it may be desired to fix the body of the cylinder 10 to its associated element and this may be done by a support 42, only a part of which is shown in Figures 2 and 3, held to the cylinder 10 by a pair of resilient locking rings 43 lodged in suitable grooves formed in the wall of the cylinder. The supporting member 42 can be mounted at either end of the cylinder as both ends of the cylinder are formed with the spaced grooves for receiving the rings 43.

The tubular member 15 is adapted to be connected to its associated movable element by means of the connection member 44 here shown as formed with a pair of sockets 45 for receiving a pair of suitable pivot pins 46 or the like. As the locking device of the present invention will move relative to the two elements interconnected thereby at least one interconnection must be pivotal to allow the cylinder and the piston to move bodily relative to the elements to be locked against movement.

As the device of the present invention is particularly adapted to be used to lock chairs of the type in which the body supporting members are relatively movable, particularly those chairs with which present-day commercial airlines equip their airplanes, the cylinder may be subject to variations in temperature. As variations in temperature will cause the volume of the liquid carried by the cylinder to also vary, some means must be provided to compensate for the expansion and contraction of the liquid held by the cylinder.

The thermal compensating means, referring now to Figures 2 and 3, comprises a cylindrically shaped member 47 formed with a central aperture slidably receiving the actuator 34. The outer peripheral surface of the member 47 is formed with an annular groove for receiving a sealing member or O-ring 48, and the wall of the centrally located aperture is formed with a similar groove for receiving an O-ring 49. A coiled spring 51, seating on an annular shoulder 52 formed on the actuator 34 normally urges the member 47 to the right, as viewed in Figures 2 and 3. It should now be seen that if the ambient temperature should fall and the liquid contracts, the spring 51 will move the member 47 to the right to compensate for the contraction of the fluid. On the other hand, if the ambient temperature should rise and bring about an expansion of the liquid within the system, the member 47 will be moved toward the left against the action of the spring 51 to compensate for the expansion of the liquid.

Although a small passage can be formed in the boss 13 to permit liquid to flow from one side of said boss to the other as the liquid expands or contracts, it has been found that the clearance between the threads of the boss 13 and the actuator 34 will form a helical passage of a size sufficient to pass the relatively small volumes of liquid which will flow from one side of the boss to the other during expansion or contraction of the liquid.

It will thus be seen that the device of the present invention is highly efficient and operable over a relatively wide temperature range. The device is compact and is easily attached to the elements, the relative movement of which it is to control. The device will lock the elements in any relative position of adjustment desired for it is not dependent on any interlocking mechanical elements for its locking action. The device furthermore does not complicate in any way the movement of the elements and in fact facilitates relative movement of the elements as compared with previously used locking devices wherein the locking action was had due to interlocking mechanical elements.

Although the now preferred embodiment of the present invention has been illustrated and described herein, it is to be understood that the invention is not to be limited thereto for it is susceptible to changes in form and detail within the scope of the appended claims.

We claim:

1. A locking device of the type described, comprising: a cylinder; a substantially non-compressible liquid filling said cylinder; a piston operating in said cylinder; means forming a liquid seal between said piston and the engaged wall surface of said cylinder; a single passageway formed through said piston; a single valve normally closing said passageway to the flow of liquid whereby said cylinder and piston are normally held against relative movement; and means, including means carried exteriorly of said cylinder, for actuating said valve to open said passageway whereby liquid may pass through the single passageway of said piston and simultaneously freeing said piston for movement in either direction relative to said cylinder.

2. A locking device of the type described, comprising: a cylinder; a substantially non-compressible liquid filling said cylinder; a piston operating in said cylinder; means forming a liquid seal between said piston and the engaged wall surface of said cylinder; a single passageway formed through said piston; a single closure; means for normally holding said closure in a position to close said passageway to the flow of liquid whereby said piston and cylinder are held against relative movement; and means, including means carried exteriorly of said cylinder for moving said closure to an inoperative position whereby liquid may pass through the passageway of said piston in either direction, thereby simultaneously freeing said piston for movement in either direction relative to said cylinder.

3. A locking device of the type described, comprising: a cylinder; a substantially non-compressible liquid completely filling said cylinder; a piston operating in said cylinder; means forming a seal between said piston and the wall surface of said cylinder; a rod extending outwardly from each face of said piston, at least one of said rods having a longitudinally extending bore communicating with a single passageway extending through said piston; a passage leading from the exterior of each rod to the adjacent end of said passageway whereby fluid may flow from one side of said piston to the other side thereof upon movement of said piston relative to said cylinder; a single valve adapted to close said passageway; means for normally holding said valve in a passageway-closing position whereby said piston and said cylinder are held against relative movement; and means carried within said bore for opening said valve to simultaneously free said piston for movement in either direction relative to the cylinder depending upon the direction of the force producing said relative movement.

4. A locking device of the type described, comprising: a cylinder; a substantially non-compressible liquid completely filling said cylinder; a piston operating in said cylinder, said piston having a single passageway extending therethrough; a tubular member extending outwardly from each face of said piston; each member being formed with a passage leading directly from the exterior thereof to the adjacent end of said passageway whereby fluid may flow from one side of said piston to the other side thereof upon movement of said piston in either direction relative to said cylinder; a single valve; means carried within one of said tubular members for normally holding said valve in a passageway-closing position whereby said piston and cylinder are normally held against relative movement; and an operating member mounted within the other of said members and movable longitudinally of the same for moving said valve to a passageway-open position and simultaneously freeing said piston for movement in either direction relative to said cylinder.

5. A locking device of the type described, comprising: a liquid-filled cylinder; a piston operating in said cylinder, said piston having a single passageway extending therethrough; a tubular member coaxially extending relative to said passageway outwardly from each face of said piston; each tubular member being formed with a passage directly leading from the exterior thereof to the adjacent end of said passageway whereby fluid may flow from one side of said piston to the other side thereof upon movement of said piston in either direction relative to said cylinder; a single valve; a valve seat formed adjacent an end of said passageway; means carried within one of said members and sealingly closing the same and including means for normally holding said valve against said seat to close said passageway to liquid flow; an operating member mounted within the other of said tubular members and movable longitudinally of the same for moving said valve to a passageway-open position, thereby simultaneously freeing said piston for movement in either direction relative to said cylinder; means flow-connecting said cylinder and said last-named tubular member; and means yieldably mounted on said operating member for sealingly closing the tubular member in which the latter is mounted, said last named sealing means being movable longitudinally of the tubular member in which the latter is mounted for compensating for expansion and contraction of the liquid held by the cylinder and flow connected to the interior of said tubular member.

6. A locking device of the type described comprising a liquid-filled cylinder; a piston operating in said cylinder, said piston having a passageway extending therethrough; a tubular member extending outwardly from each face of said piston; a passage leading from the exterior of each member to the opposite ends of said passageway whereby fluid may flow from one side of said piston to the other side thereof; a valve at the one end of said passageway; means carried within one of said members for normally holding said valve in a passageway-closing position; an operating member mounted within the other of said members and movable longitudinally of the same for moving said valve to a passageway-open position; means carried by said operating member and movable therealong defining a movable wall transversely extending within said member and sealing the same; and resilient means normally urging said movable means toward said piston, said resilient means permitting said wall to move when the liquid held by the cylinder expands when heated by ambient atmosphere.

7. A locking device of the type described, comprising: a liquid-filled cylinder; a piston operating in said cylinder, said piston having a single passageway extending therethrough; a tubular member extending outwardly from each face of said piston; each tubular member being formed with a passage leading from the exterior thereof to the adjacent end of said passageway whereby fluid may flow from one side of said piston to the other side thereof upon movement of said piston in either direction relative to said cylinder; a single valve; means carried within one of said members for normally holding said valve in a passageway-closing position whereby said piston and cylinder are normally held against relative movement; an operating member mounted within the other of said members and movable longitudinally of the same for moving said valve to a passageway-open position and simultaneously freeing said piston for movement in either direction relative to said cylinder; and means carried by the one end of said operating member for actuating the same to cause the longitudinal movement for moving said valve to the passageway-open position.

8. A locking device of the type described comprising a liquid-filled cylinder; a piston operating in said cylinder, said piston being formed with a passageway centrally extending therethrough; a tubular member extending outwardly from each face of the piston in substantially coaxial alignment with the passageway and projecting beyond the end walls of said cylinder, each tubular member being formed with at least one passage through the wall thereof communicating with the opposite ends of said passageway; a valve; a seat for said valve formed at the one end of said passageway; closure means mounted within one of said tubular members; resilient means seating on said closure means for normally holding the valve on said seat to close said passageway whereby said piston and cylinder are normally held against relative movement; an elongate operating member threadedly mounted within the other of said tubular members; a finger carried by the inner end of said operating member for moving said valve off the seat when said operating member is rotated in one direction to open said passageway to the flow of fluid from one side of said piston to the other upon the application of a force producing relative movement between said piston and cylinder; and means carried by said operating member for rotating the same.

9. In an adjustment-permitting and locking means adapted to adjustably interconnect two relatively movable elements of mechanism, the combination of a fluid filled cylinder adapted to be connected to one of said elements, a double acting piston in said cylinder, a piston rod connected to said piston and adapted to be connected to the other of said elements, a fluid passage extending through said piston from one side to the other, a valve in said passage, devices in said cylinder constantly operable to compensate for volumetric expansion and contraction of fluid in said cylinder, and manually operable means constructed and arranged to effect the opening of said valve including a push rod carried by said piston rod, said volume compensating devices serving additionally to guide said push rod.

PERCY L. PORTER.
ARTHUR D. ARMSTRONG.

REFERENCES CITED

The following references are of record in the file of this patent:

UNITED STATES PATENTS

| Number | Name | Date |
| --- | --- | --- |
| 1,448,229 | Miller et al. | Mar. 13, 1923 |
| 2,371,705 | O'Connor | Mar. 20, 1945 |
| 2,365,247 | Carlton | Dec. 19, 1944 |
| 2,507,601 | Kehle | May 16, 1950 |